(12) United States Patent
Tanaka et al.

(10) Patent No.: US 6,708,450 B2
(45) Date of Patent: Mar. 23, 2004

(54) GLASS RUN CHANNEL AND GLASS RUN CHANNEL ASSEMBLY

(75) Inventors: Yuji Tanaka, Obu (JP); Kengo Hara, Obu (JP)

(73) Assignee: Tokai Kogyo Kabushiki Kaisha, Obu (JP)

( * ) Notice: Subject to any disclaimer, the term of this patent is extended or adjusted under 35 U.S.C. 154(b) by 74 days.

(21) Appl. No.: 09/984,237

(22) Filed: Oct. 29, 2001

(65) Prior Publication Data

US 2002/0056234 A1 May 16, 2002

(30) Foreign Application Priority Data

Oct. 27, 2000 (JP) .................................. 2000-329351
Aug. 7, 2001 (JP) .................................. 2001-239684

(51) Int. Cl.⁷ .............................................. E05D 15/16
(52) U.S. Cl. ...................................................... 49/441
(58) Field of Search ....................... 49/440, 441, 475.1, 49/495.1, 489.1

(56) References Cited

U.S. PATENT DOCUMENTS

| | | | | |
|---|---|---|---|---|
| 4,947,586 A | * | 8/1990 | Mesnel et al. ................. 49/441 |
| 5,317,835 A | * | 6/1994 | Dupuy et al. .................. 49/441 |
| 5,414,961 A | | 5/1995 | Tessier | |
| 5,548,929 A | * | 8/1996 | Larsen et al. .................. 49/441 |
| 5,651,217 A | * | 7/1997 | Mesnel ........................... 49/441 |
| 5,718,084 A | * | 2/1998 | Takamiya ....................... 49/440 |
| 5,743,047 A | * | 4/1998 | Bonne et al. ................... 49/441 |
| 5,858,502 A | | 1/1999 | Tanaka | |
| 5,916,075 A | | 6/1999 | Tanaka et al. | |
| 6,205,712 B1 | * | 3/2001 | Ellis ............................... 49/41 |

FOREIGN PATENT DOCUMENTS

| | | |
|---|---|---|
| DE | 298 07 479 U1 | 8/1998 |
| EP | 0 704 597 A2 | 4/1996 |
| FR | 2585799 * | 2/1987 |
| FR | 2 585 799 | 6/1987 |
| FR | 2 690 654 | 11/1993 |
| JP | 5-86641 | 11/1993 |
| JP | 7-69075 | 3/1995 |
| JP | 9-104236 | 4/1997 |

\* cited by examiner

Primary Examiner—Jerry Redman
(74) Attorney, Agent, or Firm—Oblon, Spivak, McClelland, Maier & Neustadt, P.C.

(57) ABSTRACT

A glass run channel having a shock absorption member provided in a direction crossing a movement direction of a windowpane with a gap provided between a base bottom portion and the shock absorption member. A low-friction material layer is integrally provided at a contact face of the shock absorption member which is configured to come into contact with an edge of the windowpane and a back face of the contact face and/or a bottom face of the base bottom portion opposite the back face.

13 Claims, 17 Drawing Sheets

GLASS RUN CHANNEL AND GLASS RUN CHANNEL ASSEMBLY

CROSS-REFERENCES TO RELATED APPLICATIONS

The present application claims priority under 35 U.S.C. §119 to Japanese Patent Application No.2000-329351, filed Oct. 27, 2000, entitled "GLASS RUN CHANNEL AND WINDOWPANE ASSEMBLY" and Japanese Patent Application No.2001-239684, filed Aug. 7, 2001, entitled "GLASS RUN CHANNEL AND GLASS RUN CHANNEL ASSEMBLY". The contents of these applications are incorporated herein by reference in their entirety.

BACKGROUND OF THE INVENTION

1. Field of the Invention

The present invention relates to a glass run channel that can be mounted on a window frame of a variety of vehicles or the like and the glass run channel assembly using the same.

2. Discussion of the Background

A window assembly in an automobile is generally composed of a window frame, a glass run channel mounted on the window frame, and a windowpane configured so as to move inside the glass run channel, for example, in a vertical direction or a horizontal direction, and slide inside the glass run channel.

In the window frame, a portion between an end of a windowpane and a glass run channel is sealed, and leakage such as rain water at a gap between the windowpane and the window frame is prevented. Further, an occurrence of a windage noise is prevented between the windowpane and the window frame during vehicle running.

In recent years, in the window assembly, opening and closing of the windowpane has been achieved by an electrically driven elevation device.

In the case where the windowpane is closed by means of the elevation device, an edge of the windowpane (where the edge of the windowpane denotes the end of the windowpane, and in particular, denotes the end in a movement direction when the windowpane is slid) stops in abutment with the glass run channel mounted on the window frame. Due to this stoppage, a shock noise occurs, which may make a driver and attendant feel discomfort.

Hereinafter, this stoppage noise is referred to as a bottoming noise.

The bottoming noise does not occur at a particularly determined site. The shape of the edge of the windowpane and the shape of the glass run channel are not unified due to a variety of factors during manufacture. Thus, a bottoming noise occurs at a first portion in abutment with the glass run channel at the edge of the moving windowpane.

Conventionally, some configurations have been proposed in order to prevent an occurrence of this bottoming noise. For example, Japanese Patent Application Laid-open No. 9-104236 proposed a structure in which an internal lip extending from a center base of a glass run channel is provided such that a bottoming noise is reduced.

In addition, in Japanese Utility Model Application Laid-open No. 5-86641, a base portion of a glass run channel is configured in two steps and in a hollow shape, thereby a bottoming noise is reduced with this structure.

In Japanese Patent Application Laid-open No. 7-69075, there is proposed a configuration in which a lip consisting of polyethylene with a low frictional coefficient is provided on the inner depth face of the glass run channel such that a bottoming noise is reduced.

However, with any of these structures, an effect of reducing a bottoming noise could not be satisfactorily obtained.

SUMMARY OF THE INVENTION

The present invention provides a glass run channel and a glass run channel assembly in which a bottoming noise is hardly generated.

According to a first aspect of the present invention, there is provided a glass run channel mounted on a window frame of a vehicle body and configured so that a windowpane slides inside thereof. The glass run channel includes a main body portion having a pair of side wall portions and a base bottom portion connecting the pair of side wall portions. Seal lips are formed to protrude from an opening edge side of the pair of side wall portions to the base bottom portion, and a shock absorption member is provided in a direction crossing a movement direction of the windowpane with a gap provided between the base bottom portion and the shock absorption member. Low-frictional material layers are provided integrally at least at a contact face of the shock absorption member which is configured to come into contact with an edge of the windowpane, and at a back face of the contact face and/or a bottom face of the base bottom portion opposite the back face.

The present invention advantageously provides a glass run channel that has a shock absorption member, which is provided in a direction crossing the movement direction of the windowpane with a gap provided between a base bottom portion and the shock absorption member. The invention further advantageously provides a low-friction material layer that is integrally provided at least at a contact face of the shock absorption member, which comes into contact with an edge of the windowpane, and at a back face of the contact face and/or a bottom face of the base bottom portion opposite the back face.

The movement direction of the windowpane denotes a windowpane closing direction when the windowpane is closed.

For example, in the case of a window provided at a front door or the like of a normal automobile (refer to FIG. 5), a windowpane is expelled from the inside of the door, and abuts against the upper portion of the window frame, and the window is closed by means of the windowpane. In this case, the movement direction of the windowpane is an upward direction.

Further, in the case of a window provided on a side face of a bus or the like (refer to FIG. 15), the windowpane generally has a forward/rearward direction of the vehicle, that is, a forward or rearward movement direction.

In the present invention, a low-friction material layer can be provided only at a back face of a shock absorption member (refer to FIG. 1) or only at a bottom face of a base bottom portion (refer to FIG. 10). Further, such a low-friction material layer can be provided at both of the back face of the shock absorption member and the bottom face of the base bottom portion (refer to FIG. 14).

The low-friction material layer can be provided at other places like both side wall portions and seal lips of the glass run channel (refer to FIG. 1 or the like).

In a glass run channel according to the present invention, an edge of a windowpane comes in contact with a shock absorption member provided at a base bottom portion, whereby the shock absorption member is elastically deformed and stops in contact with the base bottom portion while absorbing the shock energy.

Therefore, when the base bottom portion of the glass run channel and the shock absorption member collide with each other, the moving velocity of the edge of the windowpane is gradually reduced, and the movement stops. The collision energy is reduced, and thus, the bottoming noise is reduced.

A low-friction material layer is provided at a back face of the shock absorption member and/or at a bottom face of a base bottom portion, whereby a friction between the shock absorption member and the bottom face of the base bottom portion is small. Thus a displacement of the shock absorption member is not prevented. Hence, when the base bottom portion of the glass run channel and the shock absorption member collide with each other, the shock absorption member can be easily displaced, and absorption of collision energy is reliably performed.

As has been described above, according to the present invention, there is provided a glass run channel in which an occurrence of a bottoming noise is prevented.

In addition, a low-friction material layer exists on at least one of the shock absorption member and the bottom face of the base bottom portion, whereby friction is small when they come into contact with each other, or separate. Thus a noise between them is hard to be generated. In this manner, when a windowpane is opened, the shock absorption member is separated from the bottom face of the base bottom portion. However, an adhering of them is prevented at this time, and thus, an occurrence of a stick slip noise can be prevented.

It is preferable that the shock absorption member is made of a extrusion molding of a thermoplastic elastomer. The thermoplastic elastomer maintains proper elasticity, and thus, an effect of the present invention can be better attained. In addition, when such an elastomer is disposed, even if it is burned, no harmful gas occurs, which is safe.

As the thermoplastic elastomer, for example, there can be employed a Milastomer available from Mitsui Chemicals, Inc. and Santoprene available from AES Japan Ltd. or the like.

Next, according to a second aspect of the invention, there is provided a glass run channel assembly mounted on a window frame of a vehicle body. The glass run channel assembly has an abutment glass run channel mounted to a side against which a windowpane abuts after the windowpane has moved. The glass run channel assembly also has side part glass run channels mounted substantially parallel to a movement direction of the windowpane at both sides of the abutment glass run channel. The abutment glass run channel and the side part glass run channels are assembled integrally with each other, each having a main body portion having a pair of side wall portions and a base bottom portion connecting the pair of side wall portions. The abutment glass run channel and side part glass run channels also have seal lips formed to be protruded from an opening edge side of the pair of side wall portions toward the base bottom portion, wherein the abutment glass run channel has a shock absorption member provided in a direction crossing a movement direction of the windowpane with a gap provided between the shock absorption member and the base bottom portion. Low-friction material layers are provided integrally at a contact face of the shock absorption member that is configured to come into contact with an edge of the windowpane, and at least one of a back face of the contact face and a bottom face of the base bottom portion opposite the back face. The side part glass run channels do not have a shock absorption member. The abutment glass run channel and side part glass run channel are connected to each other at their terminals by means of an additional connection member while maintaining a predetermined angle in a nonlinear manner.

In a glass run channel assembly according to the present invention, an edge of a windowpane comes into contact with a shock absorption member provided at a base bottom portion, and the shock absorption member is elastically deformed, and stops while absorbing shock energy.

Thus, when the base bottom portion and shock absorption member of the glass run channel assembly collide with each other, the movement velocity of the edge of the windowpane is gradually reduced, and the movement stops. The collision energy is gradually absorbed by the shock absorption member, and the moving velocity is reduced. Thus, a bottoming noise is reduced as well.

In addition, a low-friction material layer is provided at the back face of the shock absorption member and/or on the bottom face of the base bottom portion, a friction between the shock absorption member and the bottom face of the base bottom portion is reduced, and the shock absorption member is not prevented from being elastically deformed. Therefore, when the base bottom portion and shock absorption member of the glass run channel collide with each other, the shock absorption member can be easily displaced, and collision energy absorption is reliably carried out.

On the other hand, although the side part glass run channel is connected with the abutment glass run channel, the shock absorption member does not exist on the side part glass run channel. Thus, when the windowpane moves, it does not come into contact with the shock absorption member. Thus, there is an advantageous effect that a slide resistance is not increased when the windowpane moves.

As has been described above, according to the present invention, there can be provided a glass run channel assembly that prevents an occurrence of a bottoming noise without increasing the slide resistance. The detail is similar to the above description of the glass run channel.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DESCRIPTION OF THE PREFERRED EMBODIMENTS

In the first aspect of the invention, it is preferable that the shock absorption member is connected integrally with the base bottom portion and/or the side wall portion at least partly of a widthwise direction.

In this manner, a glass run channel with the shock absorption member integrally formed thereon can be easily molded by extrusion molding and is easily manufactured.

Figure 1:
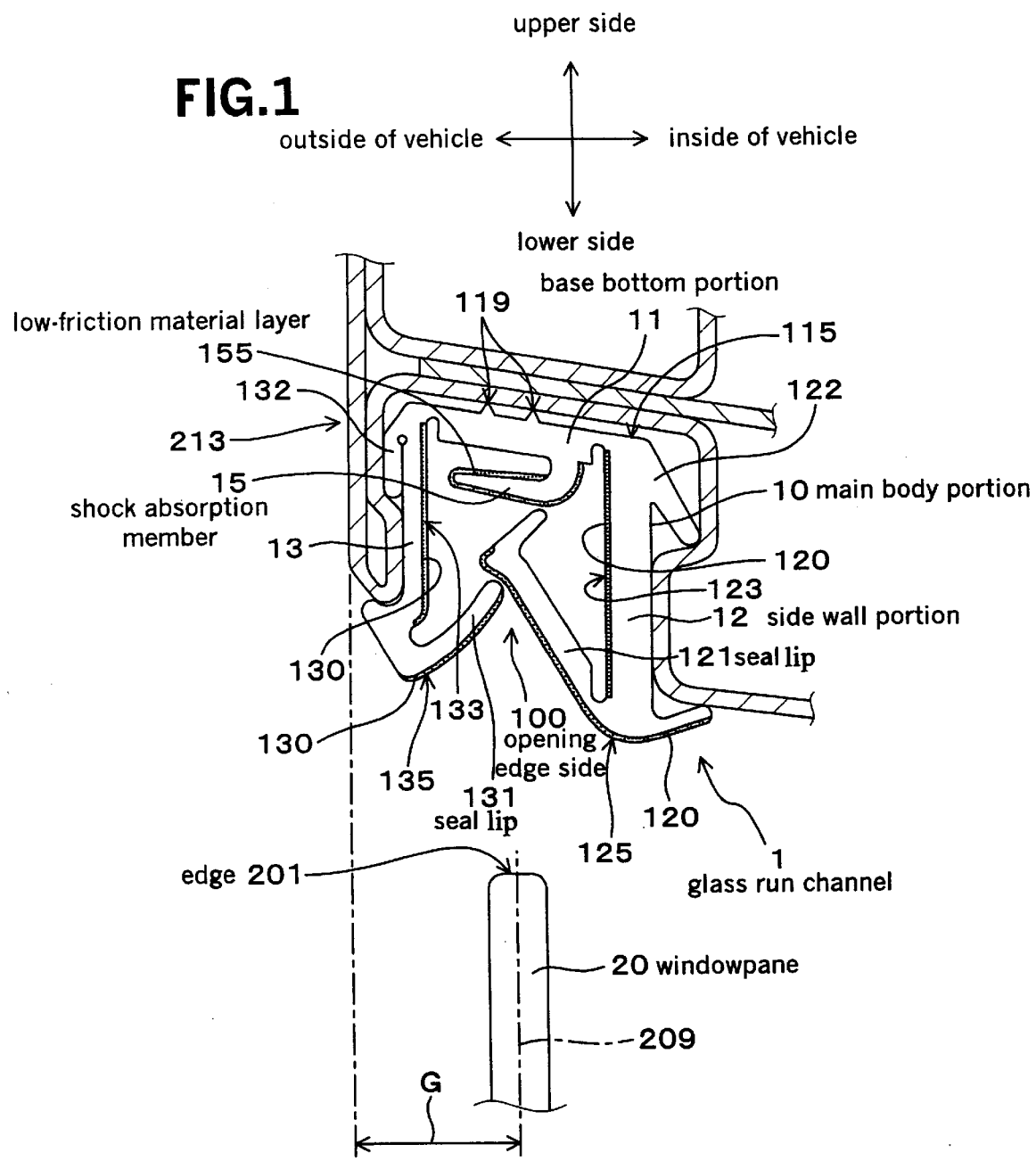
FIG. 1 is a sectional view taken along the line IA—IA in FIG. 5, and the lines IB—IB and IC—IC in FIG. 6, illustrating a glass run channel having a shock absorption member in accordance with the Embodiment 1.

It is preferable that the shock absorption member has a connecting portion integrally connected with the base bottom portion and/or the side wall portion, and is constructed so as to be protruded from the connecting portion in a cantilever beam shape (refer to FIG. 1).

In this manner, the degree of freedom of deformation of the shock absorption member is increased. Thus, in abutment of the windowpane, the shock absorption member is reliably elastically deformed, and a shock energy can be absorbed.

Figure 13:
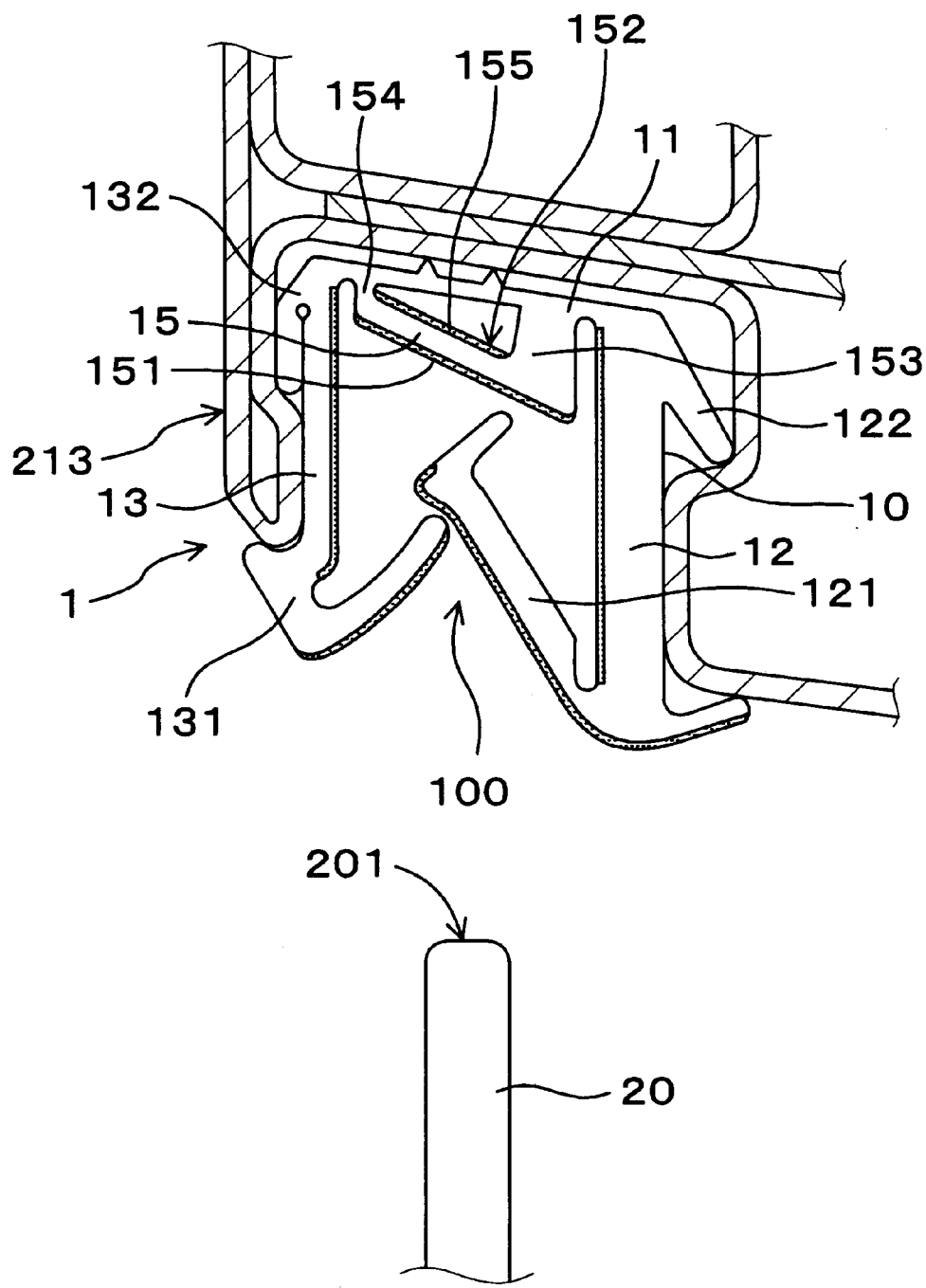
FIG. 13 is a sectional view illustrating a glass run channel in which a shock absorption member is in a simple beam shape in accordance with Embodiment 3.

It is preferable that the shock absorption member has connecting portions integrally connected with the base bottom portion and/or the side wall portion, and is constructed so as to be protruded from the connecting portions in a simple beam shape (refer to FIG. 13).

In this manner, a shock absorption member with its excellent durability can be obtained.

It is preferable that the shock absorption member is formed so as not to be at right angles to the movement direction of the windowpane, and is inclined to the inside or outside of the vehicle.

In this manner, when movement of the windowpane stops, the windowpane glass slides on the surface of the shock absorption member coming into contact with an edge of the windowpane in a direction crossing the movement direction, and the windowpane can be inclined toward either the inside or outside of the vehicle from the movement direction.

Therefore, the windowpane can come into strong contact with a seal lip inside or outside of the vehicle, the sealing properties at this contact portion is improved, and intrusion of water or the like into the vehicle can be reliably prevented.

Figure 11:
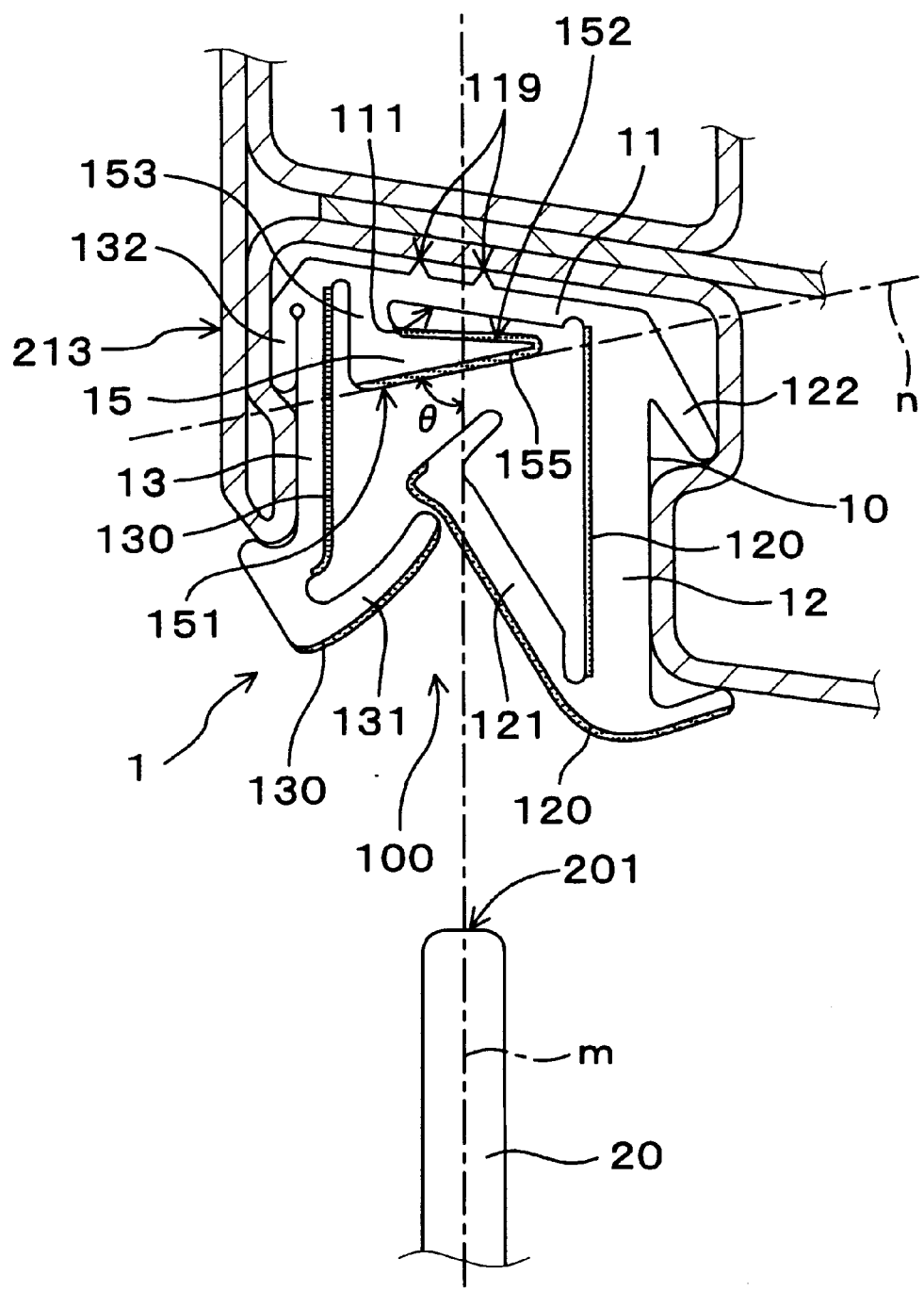
FIG. 11 is a sectional view illustrating a glass run channel in which a shock absorption member is formed at an angle that is not vertical to the movement direction of a windowpane in accordance with Embodiment 2.

As shown in FIG. 11, in the case where an angle θ formed when the movement direction of the windowpane "m" (in this example, "m" denotes the direction of the thickness center line of the windowpane) crosses a direction "n" parallel to a contact face 151 relevant to the edge of the windowpane of the shock absorption member is set to other than 90 degrees, the fact that the shock absorption member is constructed to be not vertical to the movement direction of the windowpane in accordance with the present embodiment is established. In this case, an angle θ is an acute angle.

It is preferable that the shock absorption member is connected integrally with the base bottom portion and/or the side wall portion at least partly of a widthwise direction.

Next, it is preferable that the shock absorption member has a connecting portion connected integrally with the base bottom portion and/or the side wall portion, and is constructed so as to be protruded from the connecting portion in a cantilever beam shape.

Next, it is preferable that the shock absorption member has connecting portions connected integrally with the base bottom portion and/or the side wall portion, and is constructed so as to be protruded from the connecting portions in a simple beam shape.

Next, it is preferable that the shock absorption member is formed so as not to be at right angles to the movement direction of the windowpane, and is inclined to the inside or outside of the vehicle.

In these cases, advantageous effect similar to the above can be obtained.

For example, as shown in the Embodiment 1 described later, in a glass run channel assembly of such type as the windowpane moves from the bottom to the top, a shock absorption member is provided at the abutment glass run channel positioned at the upper part of the window frame.

In addition, as shown in the Embodiment 4 described later, in a glass run channel assembly of such type as the windowpane moves rearward or forward of a vehicle body, a shock absorption member is provided at the abutment glass run channel positioned at the side of the window frame.

Embodiment 1

A glass run channel and glass run channel assembly according to Embodiment 1 of the present invention will be described with reference to FIG. 1 to FIG. 10.

Figure 5:
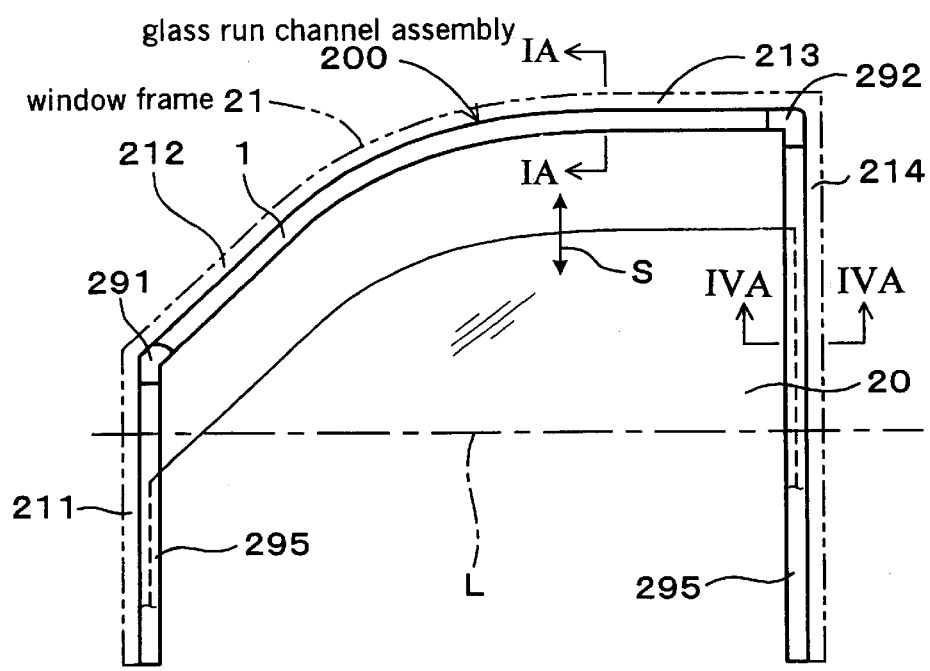
FIG. 5 is an illustrative view of a glass run channel assembly of a front door in accordance with the Embodiment 1.
Figure 6:
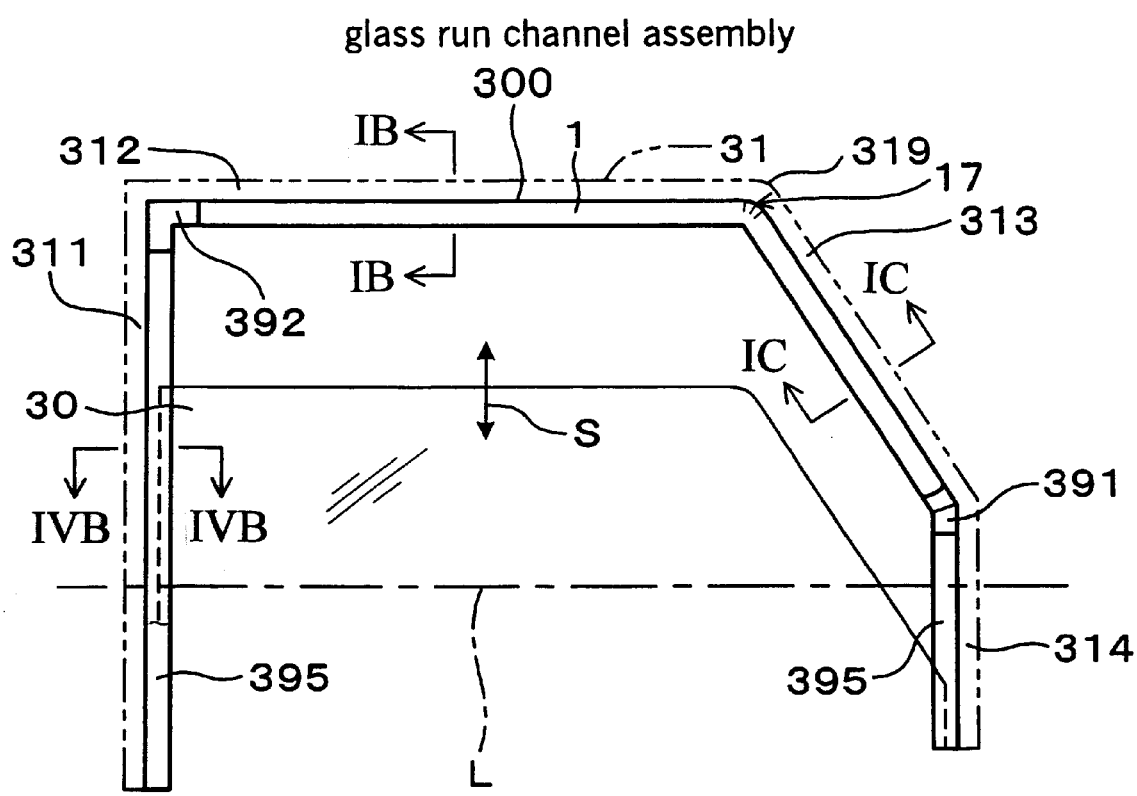
FIG. 6 is an illustrative view of a glass run channel assembly of a rear door in accordance with the Embodiment 1.

A glass run channel 1 according to the present embodiment, as shown in FIG. 5 and FIG. 6, is mounted on window frames 21 and 31 of a vehicle, and is constructed so that windowpanes 20 and 30 slide the inside thereof.

The glass run channel 1 according to the present embodiment, as shown in FIG, 1 has a main body portion 10 that includes a pair of a vehicle inside side wall portion 12 and a vehicle outside side wall portion 13 and a base bottom portion 11 connecting the pair of the side wall portions 12 and 13, and a vehicle inside seal lip 121 and a vehicle outside seal lip 131 formed to be protruded from an opening edge side 100 of the pair of side wall portions 12 and 13 toward the base bottom portion 11.

Figure 2:
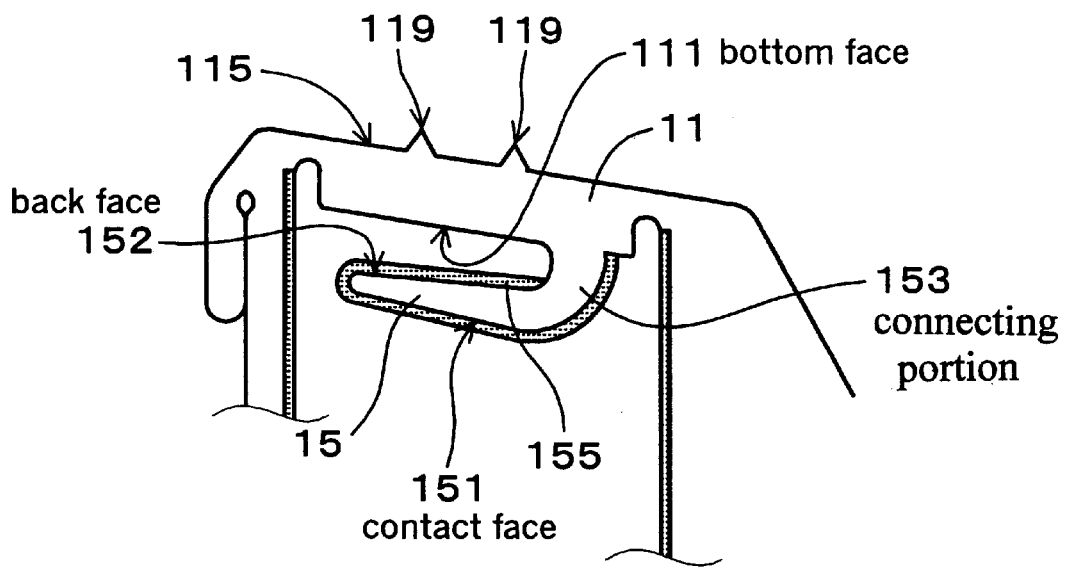
FIG. 2 is a view illustrating essential portions of a shock absorption member in accordance with the Embodiment 1.

As shown in FIG. 2, the glass run channel has a shock absorption member 15, which is provided in a direction crossing the movement direction of a windowpane 20 with a gap provided between the base bottom portion 11 and the shock absorption member 15. In the shock absorption member 15, a low-friction material layer 155 is provided integrally at a contact face 151 coming into contact with an edge 201 of the windowpane 20 and the back face 152 of the contact face 151.

As shown in FIG. 1, the glass run channel 1 according to the present embodiment includes a base bottom portion 11 and a vehicle inside side wall portion 12 and a vehicle outside side wall portion 13 that extend from both sides of the base bottom portion 11. Slip-off proof lips 122 and 132 are provided, respectively, toward the inside and outside of the vehicle at the roots of both side wall portions 12 and 13.

Seal lips 121 and 131 extending toward the base bottom portion 11 inside of the glass run channel 1 is provided at an opening edge side 100 of both side wall portions 12 and 13.

As shown in FIG. 2, two protrusions 119 are provided at a back face 115 of the base bottom portion 11.

As shown in FIG. 2, the shock absorption member 15 has a connecting portion 153 at a portion which is near the inside of the vehicle rather than the outside of the vehicle in the base bottom portion 11, and is constructed so as to be protruded from the connecting portion 153 toward the outside of the vehicle in a cantilever beam shape. The shock absorption member 15 is entirely provided along the longitudinal direction of the glass run channel 1 (refer to FIGS. 7(a) and 7(b)).

As shown in FIG. 2, a low-friction material layer 155 is provided respectively on a back face 152 of the shock absorption member 15, which faces a bottom face 111 of a base bottom portion 11 and on a contact face 151 of the shock absorption member 15 with which an edge 201 of the windowpane 20 comes into contact.

As shown in FIG. 1, low-friction material layers 120 and 130 are provided at the inside faces 123 and 133 of both side wall portions 12 and 13 and glass contact faces 125 and 135 of the seal lips 121 and 131 as well as the shock absorption member 15.

Figure 3:
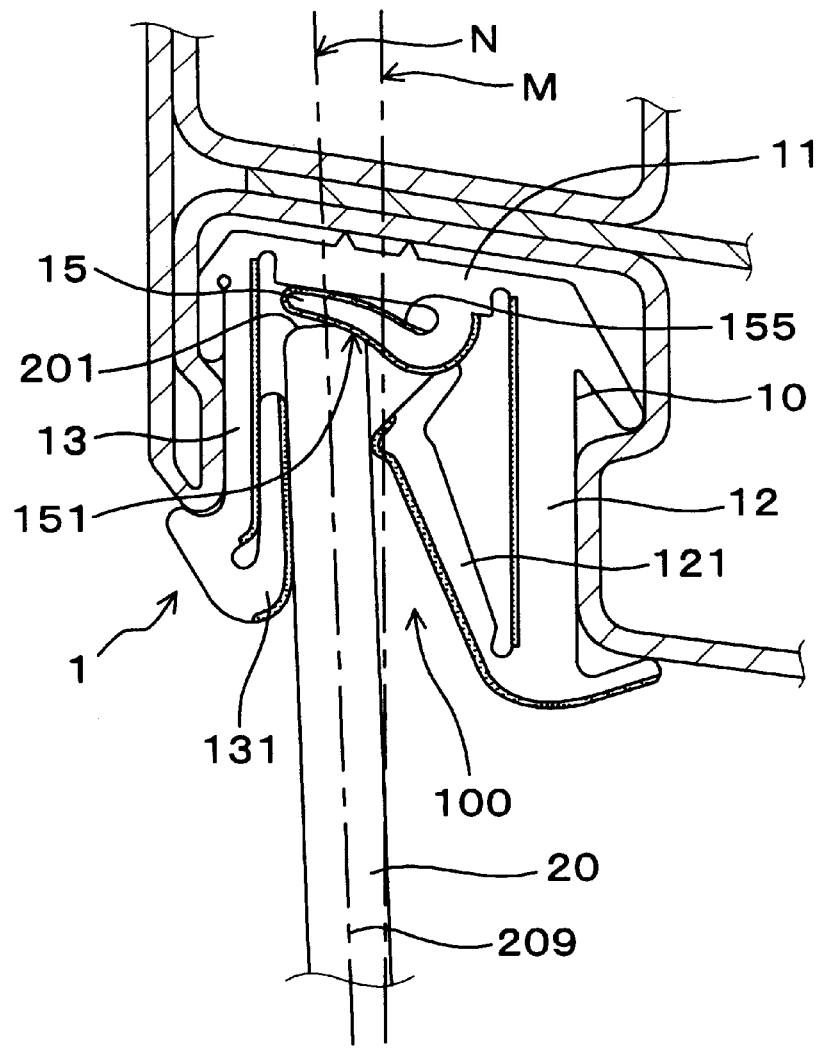
FIG. 3 is a view illustrating a state in which a closed windowpane comes into contact with a glass run channel shown in FIG. 1, and is displaced toward the outside of the vehicle in accordance with the Embodiment 1.

As shown in FIG. 3, when the windowpane 20 is closed, the seal lips 121 and 131 of the glass run channel 1 abut against the side face of the windowpane 20, and the edge 201 of the windowpane 20 abuts against the contact face 151 of the shock absorption member 15.

With the elastical deformation of the shock absorption member 15, the contact face 151 is displaced to the outside of the vehicle in a inclined shape, whereby the edge 201 of the windowpane 20 slides on the contact face 151 and the edge 201 moves from the position M to the position N. Thus the windowpane 20 is displaced to the outside of the vehicle.

The low-friction material 155 is formed on the contact face 151, which makes the slide reliably.

The main body portion 10, the vehicle inside seal lip 121 and outside seal lip 131, the slip-off proof lips 122 and 132, and the shock absorption member 15 or the like are composed of thermoplastic elastomer. A low-friction material layer 155, 120, or 130 are composed of a material formed by mixing silicone or silicone compound with the thermoplastic elastomer.

The main body portion 10 and the shock absorption member 15 and low-friction material layers 155, 120, and 130 are integrally molded by utilizing co-extrusion molding or the like.

Instead of the above process, after the main body portion 10 and shock absorption member 15 have been extrusion molded, a low friction coating can be applied to the corresponding portion. Alternatively, a prefabricated low friction film may be adhered after extrusion.

Now, glass run channel assemblies 200 and 300 according to the present embodiment will be described here.

FIGS. 5 and 6 show the glass run channel assembly 200 for an automobile front door and the glass run channel assembly 300 for an automobile rear door, respectively.

The glass run channel assemblies 200 and 300 are mounted on window frames 21 and 31 and arranged so as to slide inside to guide movement of the windowpanes 20 and 30 for the front and rear sides, respectively. In these glass run channel assemblies 200 and 300, the line indicated by dashed line L in the figures denotes a top end position of the door panel main body.

As described later, the glass run channel 1 is disposed at the upper side of the window frame, and is an abutment glass run channel against which an edge of an advancing windowpane abuts. The side part glass run channels 295 and 395 are assembled at both sides in the forward and rearward directions of the glass run channel 1. That is, the abutment glass run channel 1 and the side part glass run channels 295 and 395 are connected to each other by insert injection molded corner members 291, 292, 391 and 392, and are integrally assembled to configure a front door glass run channel assembly 200 (FIG. 5) and a rear door glass run channel assembly 300 (FIG. 6). Then, these glass run channel assemblies 200 and 300 are mounted to window frames 21 and 31 (FIGS. 5 and 6).

In FIGS. 5 and 6, an arrow S indicates a direction to which windowpanes 20 and 30 move in opening and closing of the windowpanes. The movement direction is upward. The window panes 20 and 30 rise from the lower side to the upper side in the figures and then stop in abutment with the glass run channel 1 provided at a front pillar side window frame 212 described later, a roof side upper window frame 213, and a rear pillar window frame 313 and a roof side upper window frame 312.

As shown in FIG. 5, in the glass run channel assembly 200 for front door, a window frame 21 is composed of a front side longitudinal window frame 211, a front pillar side window frame 212, a roof side upper window frame 213, and a center pillar side longitudinal window frame 214. The glass run channel assembly 200 or the like are mounted on the inside of this window frame 21.

Now, a glass run channel 1 or the like mounted on the window frame 21 will be described in detail. First, a front pillar side window frame 212 and a roof side upper window frame 213 are integral window frames where the glass run channel 1 shown in FIGS. 1 and 2 is mounted.

Corners are provided between the front side longitudinal window frame 211 and the front pillar side window frame 212 and between the roof side upper window frame 213 and the center pillar side longitudinal window frame 214. At these two corners, there are disposed glass run channel corner members 291 and 292 as connection members, formed by injection molding described previously, respectively, thereby integrally connecting the adjacent glass run channels with each other at these corner members.

Figure 4:
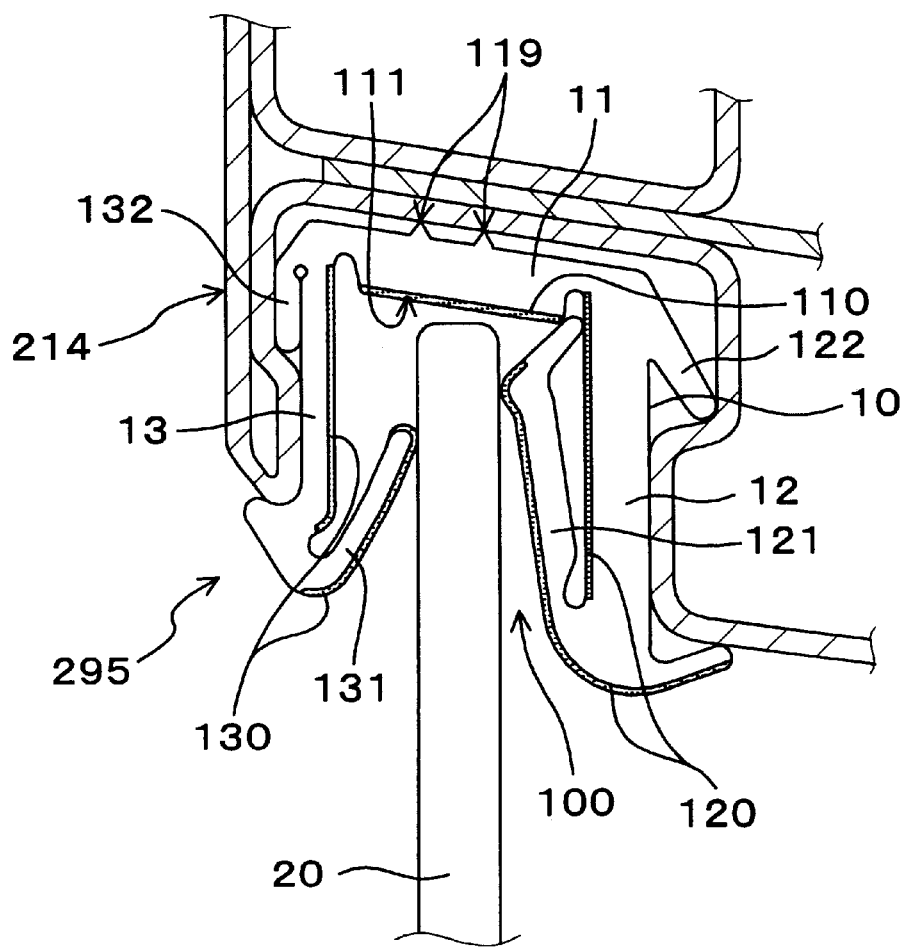
FIG. 4 is a sectional view taken along the line IVA—IVA in FIG. 5 and the line IVB—IVB in FIG. 6, illustrating a glass run channel that does not have a shock absorption member in accordance with the Embodiment 1.

A side part glass run channel 295 as shown in FIG. 4 with no shock absorption member is mounted to the front side longitudinal window frame 211 and center pillar side longitudinal window frame 214.

This side part glass run channel 295, as shown in FIG. 4, has the same structure as the glass run channel 1 shown in FIG. 1 except that no shock absorption member is provided, and has a main body portion 10 that includes a pair of side wall portions 12 and 13 and a base bottom portion 11 connecting the pair of side wall portions 12 and 13 with each other, and seal lips 121 and 131 formed to be protruded from an opening edge side 100 to the base bottom portion 11.

FIG. 1 is a cross sectional view taken along line IA—IA in FIG. 5, and is a cross sectional view taken along the lines IB—IB IC—IC in FIG. 6, and FIG. 4 is a cross sectional view taken along line IVA—IVA in FIG. 5, and is a cross sectional view taken along line IVB—IVB in FIG. 6.

As shown in FIG. 6, in a rear door glass run channel assembly 300, a window frame 31 is composed of a center pillar side longitudinal window frame 311, a roof side upper window frame 312, a rear pillar side window frame 313, and a rear pillar side longitudinal window frame 314. A glass run channel assembly 300 is disposed inside of this window frame 31.

In the window frame 31, at corners between the center pillar side longitudinal window frame 311 and the roof side upper window frame 312 and between the rear pillar side window frame 313 and rear lower pillar side longitudinal window frame 314, glass channel corner members 392 and 391 are disposed in the same manner, respectively.

Figure 7:
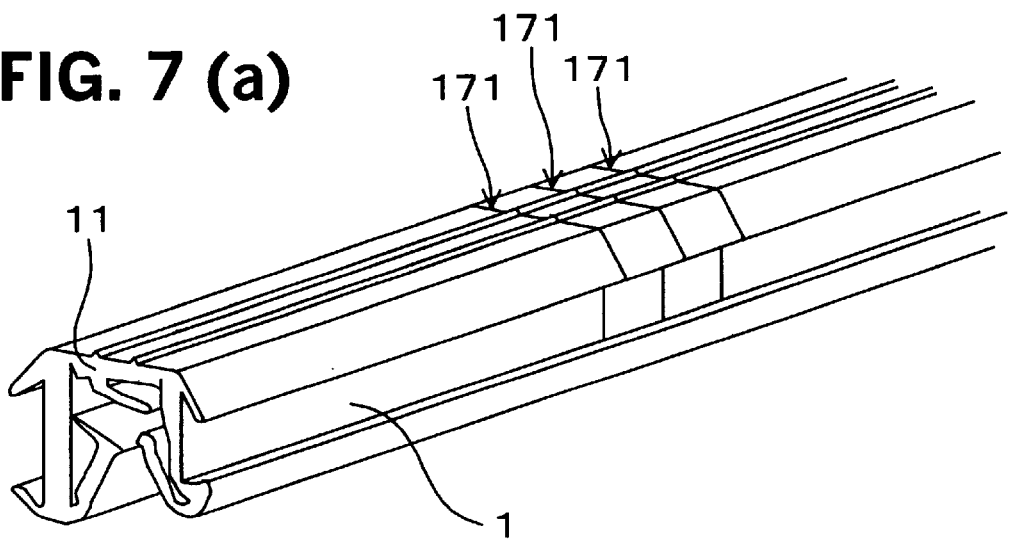
FIGS. 7(a) and 7(b) are illustrative views when a glass run channel is bent in accordance with the Embodiment 1.
Figure 7B:
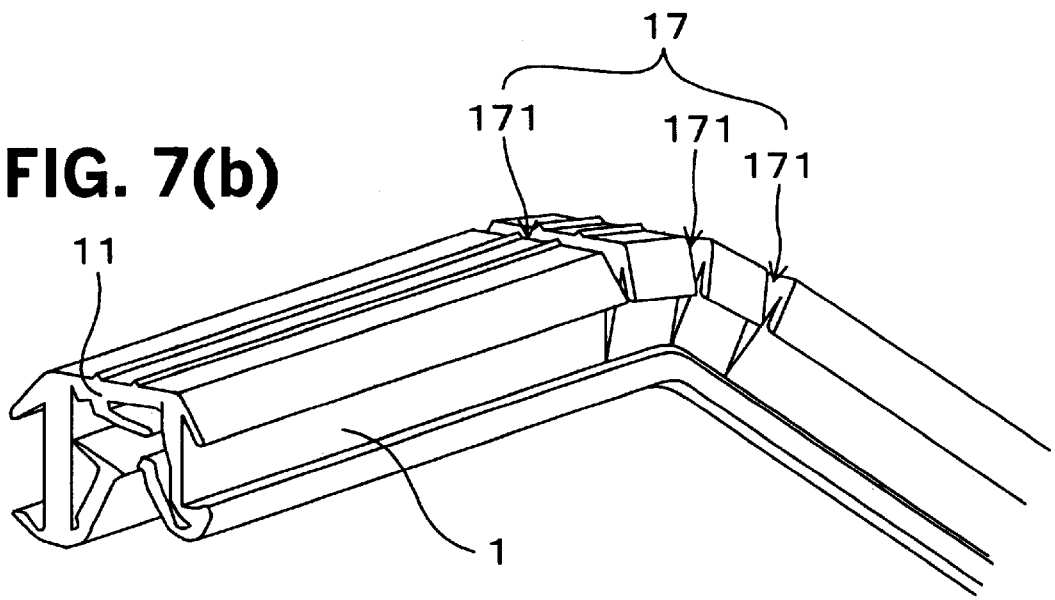

One glass run channel 1 is disposed between the roof side upper window frame 312 and the rear pillar side window frame 313, at a corner 319 between both of these window frames 312 and 313, as shown in FIG. 7(a), a plurality of slits 171 (three here) are provided at the outside of the base bottom portion 11 of the glass run channel 1, and as shown in FIG. 7(b), a curve portion 17 in accordance with the shape of the corner 319 is formed.

A glass run channel 1 having a shock absorption member 15 provided there is mounted on the roof side upper window frame 312 and the rear pillar side window frame 313.

On the other hand, a glass run channel 395 to be mounted to other longitudinal window frames 311 and 314 shall be a type with no shock absorption member 15, as shown in FIG. 4.

Now, a glass run channel assembly in the present embodiment will be described with reference to FIGS. 5 and 6.

That is, first, with respect to a front door glass run channel assembly 200 shown in FIG. 5, in a window frame 21 of a vehicle body, an abutment glass run channel 1 mounted to a side against which a windowpane 20 abuts after the glass has moved and side part glass run channels 295 mounted at both sides, that is, at front and rear sides of a vehicle, of the abutment glass run channel 1 are integrally assembled.

The side part glass run channel 295 is constructed so that the windowpane 20 slides inside of the glass run channel 295. In addition, the side part glass run channel 295 has a main body portion 10 that includes a pair of side wall portions 12 and 13 and a base bottom portion 11 connecting the pair of side wall portions with each other, and seal lips 121 and 131 formed to be protruded from an opening edge side of the pair of side wall portions toward the base bottom portion 11.

In the present embodiment, the abutment glass run channel 1 has a shock absorption member 15 provided in a direction crossing the movement direction of the windowpane 20 with a gap provided between the shock absorption member 15 and the base bottom portion 11. In addition, a low-friction material layer 155 is provided integrally at the back face of a face coming into contact with an edge of the windowpane of the shock absorption member.

In addition, a glass run channel assembly 300 shown in FIG. 6 is similar to the above.

On the other hand, the side part glass run channels 295 (FIG. 5) and side part glass run channels 395 at both sides do not have a shock absorption member as shown in FIG. 4 which is a cross sectional view taken along line IVA—IVA in FIG. 5 and line IVB—IVB in FIG. 6, unlike the abutment glass run channel 1.

Thus, when the windowpanes 20 and 30 move, the side part glass run channel with no shock absorption member is not pushed at the outer periphery end of the windowpanes 20 and 30. Therefore, the slide resistance during movement of the windowpane does not increase.

Now, the scale of shock when the windowpane 20 is closed in cases of that the shock absorption member 15 is provided and that the shock absorption member 15 is not provided will be described with reference to FIG. 8.

The longitudinal axis in the figure denotes a movement velocity of the windowpane 20, and the horizontal axis denotes a position of the windowpane edge 201. In the horizontal axis, X denotes a position at which the windowpane edge 201 first abuts against the seal lips 121 and 131 of the glass channel 1, Y denotes a position where the edge first abuts against the shock absorption member 15, and Z denotes a stop position.

Figure 8:
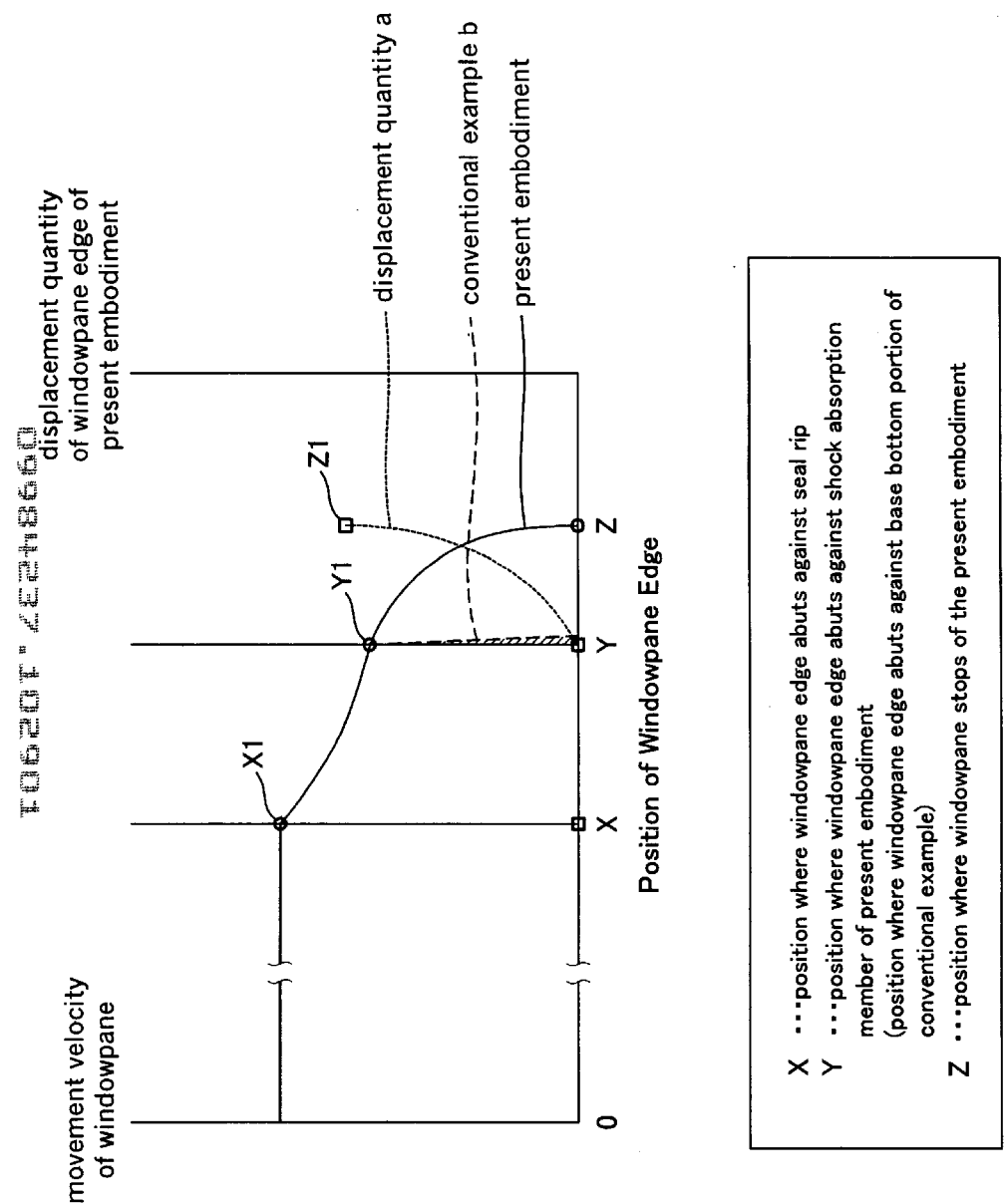
FIG. 8 is a diagram showing a relationship among a movement velocity, an edge position, and a displacement quantity of the edge, in a windowpane assembly at which a glass run channel according to the present embodiment and conventional glass run channel are mounted.

In FIG. 8, velocities of the windowpane edge 201 to move to a position of Y are the same in the present embodiment and the conventional example. On the other hand, the velocities of the windowpane edge 201 after passing the position Y are different. A case of the glass run channel 1 of the present embodiment is indicated by solid line, and a case of the conventional glass run channel with no shock absorption member is indicated by dashed line. In the case of the present embodiment, the movement velocity of the windowpane edge 201 is represented by X1. The velocity is gradually lowered until the edge of the windowpane reaches Y after passing X, and the velocity reaches Y1.

The left axis of the figure indicates the movement velocity of the windowpane, and the horizontal axis at the right side indicates a displacement quantity of the edge of the windowpane.

As shown in FIG. 1, a distance G between a center line 209 of the windowpane 20 and a surface of the window frame 213 is obtained as a predetermined value until the windowpane 20 abuts against the shock absorption member 15. As shown in FIG. 3, after the windowpane 20 has abutted against the shock absorption member 15, the center line 209 of the windowpane 20 is displaced to the outside of the vehicle. In FIG. 3, the dotted line marked with a sign M denotes a position of the center line 209 before the windowpane 20 abuts against the shock absorption member 15. The dotted line marked with a sign N denotes the center line 209 after abutment.

A displacement quantity of the glass run channel of the present embodiment relative to G (a distance relevant to the surface of the window frame 213) in FIG. 1 is described in FIG. 8 (dotted line a).

This displacement quantity continuously increases until the edge of the windowpane 20 has reached a stop position, and finally reaches Z1.

After the windowpane edge of a conventional glass run channel that does not have a shock absorption member has passed Y, the movement velocity is rapidly lowered to 0 (namely, the windowpane movement stops) because a base bottom portion is located at a portion where a shock absorption member is provided in the present embodiment. This state is indicated by dotted line b in the figure.

On the other hand, as to the glass run channel 1 of the present embodiment which has a shock absorption member provided thereof, the movement velocity of the windowpane edge is gradually lowered while the shock absorption member is elastically deformed. This state is indicated by solid line in the figure.

The shock energy absorption quantity is obtained as a value that corresponds to the movement velocity of the windowpane edge. Thus, in the conventional glass run channel in which the speed is rapidly lowered, a collision shock is hardly absorbed in the glass run channel, and a bottoming noise is occurred.

In the glass channel 1 according to the present embodiment, a shock is absorbed by the shock absorption member 15 in the glass run channel 1, and a bottoming noise is hardly generated.

The shock absorption quantity in the conventional glass run channel is in proportional to an area for a shaded hatch shown in the figure, and the shock absorption quantity in the glass run channel 1 in the present embodiment is proportional to an area for a portion enclosed with Y1, Y, and Z.

Now, an advantageous effect of the present embodiment will be described here.

In the glass run channel 1 of the present embodiment, the edge 201 of the windowpane 20 comes into contact with the shock absorption member 15 provided at the base bottom portion 11, elastically deform the shock absorption member 15 and stops. Thus, as shown in FIG. 8, the moving velocity of the windowpane edge 201 can be gradually reduced. Thus, collision energy is reduced, and a bottoming noise is not generated.

In addition, in the glass run channel of the present embodiment, a low-friction material layer 155 is provided on a back face 152 of the shock absorption member 15, a friction between the shock absorption member 15 and the bottom face 111 of the base bottom portion is reduced, and an elastical deformation of the shock absorption member 15 is not prevented. Therefore, the shock absorption member 15 is easily displaced during collision with the windowpane edge 201, and a collision energy is reliably absorbed.

Thus, when the back face 152 of the shock absorption member 15 and the bottom face 111 of the base bottom portion come into contact with each other and separate, friction is low. Thus, a noise between them is hardly generated. Therefore, an occurrence of a stick slip noise when the windowpane 20 is opened can be prevented.

In addition, because a low-friction material layer 155 is provided at a contact face 151 as well the edge 201 of the windowpane 20 slide easily on the contact face 151, the shock absorption member 15 can be displaced easily at a stop position of the windowpane edge 201. Further, a wear of the shock absorption member 15 can be reduced.

As has been described above, according to the present embodiment, there can be provided a glass run channel in which a bottoming noise is hardly generated.

Further, according to the present embodiment, in the glass run channel assembly 200 for a front door (refer to FIG. 5), a channel in which no shock absorption member 15 is provided, as shown in FIG. 4, is employed for a glass run channel 295 mounted on the front side longitudinal window frame 211 and the center pillar side longitudinal window frame 214.

Then, a channel at which the shock absorption member 15, as shown in FIG. 1, is employed for the glass run channel 1 mounted on the front pillar side window frame 212 or roof side upper window frame 213.

The front side longitudinal window frame 211 and center pillar side longitudinal window frame 214 are portions which come into contact with the side portion of the windowpane 20 when the windowpane 20 is opened and closed. The glass run channel 295 does not have a portion such that a sliding resistance is given to movement of the windowpane 20, and thus, the windowpane 20 can rise smoothly.

The shock absorption member 15 is provided at the glass run channel 1 attached to the front pillar side window frame 212 and roof side upper window frame 213 coming into contact with the edge 201 of the windowpane 20 when the edge 201 of the raised windowpane 20 stops, whereby a bottoming noise can be reduced.

In addition, the glass run channel assembly 300 shown in FIG. 6 for rear door has the similar advantageous effect.

Figure 9:
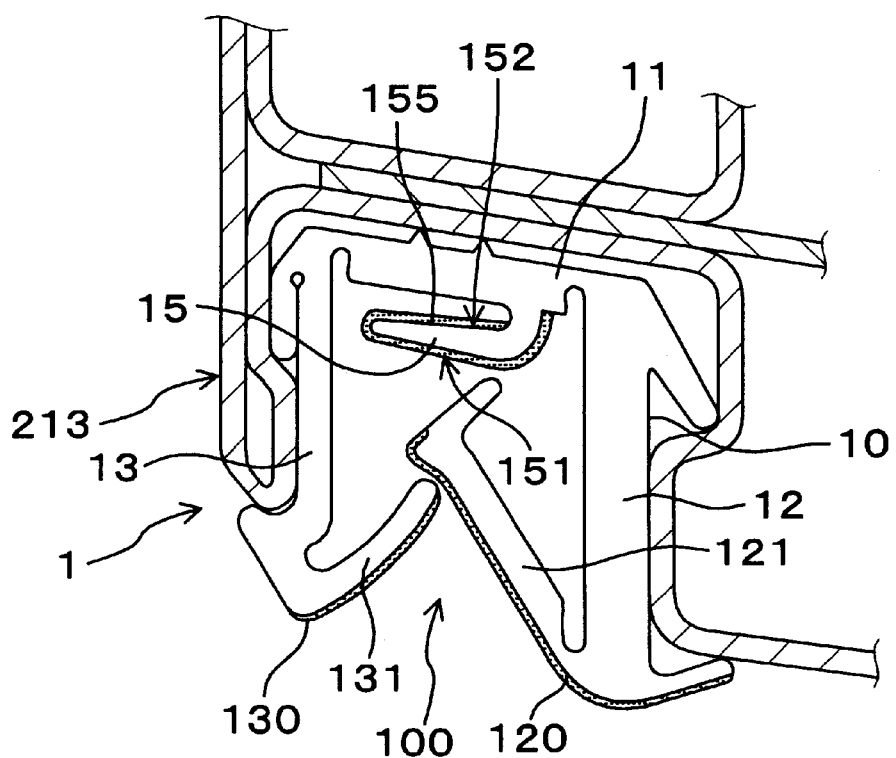
FIG. 9 is an illustrative view showing a glass run channel in which a low-friction material layer is not provided at a side wall portion in accordance with the Embodiment 1.

The glass run channel 1 according to the present embodiment, as shown in FIG. 9, may be configured such that no low friction material layer is provided at side wall portions 12 and 13.

Figure 10:
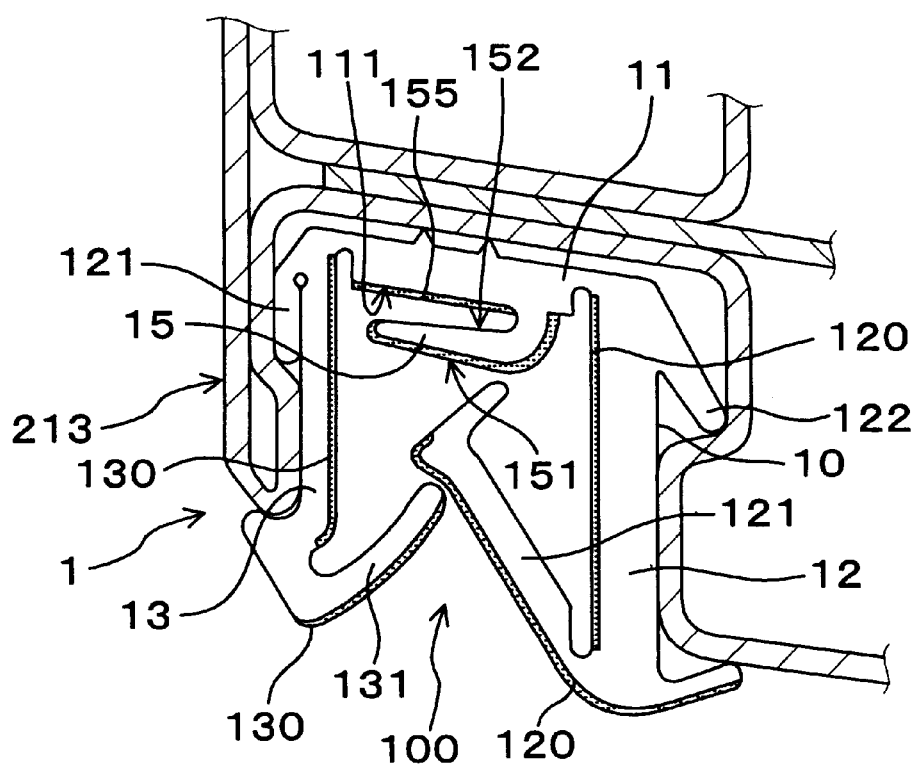
FIG. 10 is an illustrative view of a glass run channel in which a low-friction material layer is provided at a bottom face of a base bottom portion in accordance with the Embodiment 1.

In addition, as shown in FIG. 10, a low-friction material layer can be provided at only the bottom face 111 of the base bottom portion 11 opposite to the back face 152, while it is not provided at the back face 152.

Embodiment 2

As shown in FIG. 11, the present embodiment is directed to a glass run channel such that a shock absorption member is formed so as not to be vertical to the movement direction of the windowpane.

As shown in FIG. 11, the glass run channel 1 according to the present embodiment has a main body portion 10 that includes a pair of side wall portions 12 and 13 and a base bottom portion 11 connecting them, and seal lips 121 and 131 formed to be protruded from the opening edge side 100 of the side wall portions 12 and 13.

A shock absorption member 15 is provided at the base bottom portion, and a low-friction material layer 155 is integrally provided at a contact face 151 where the edge 201 of the windowpane 20 and the shock absorption member 15 contact to each other and at the back face 152 which is the other side of the shock absorption member 15.

The movement direction of the windowpane 20 is parallel to the center axis direction "m" of the windowpane 20. In addition, an angle θ at which a direction "n" parallel to the contact face 151 relevant to the windowpane edge 201 of the shock absorption member 15 crosses the center axis direction "m" is less than 90 degrees.

Figure 12:
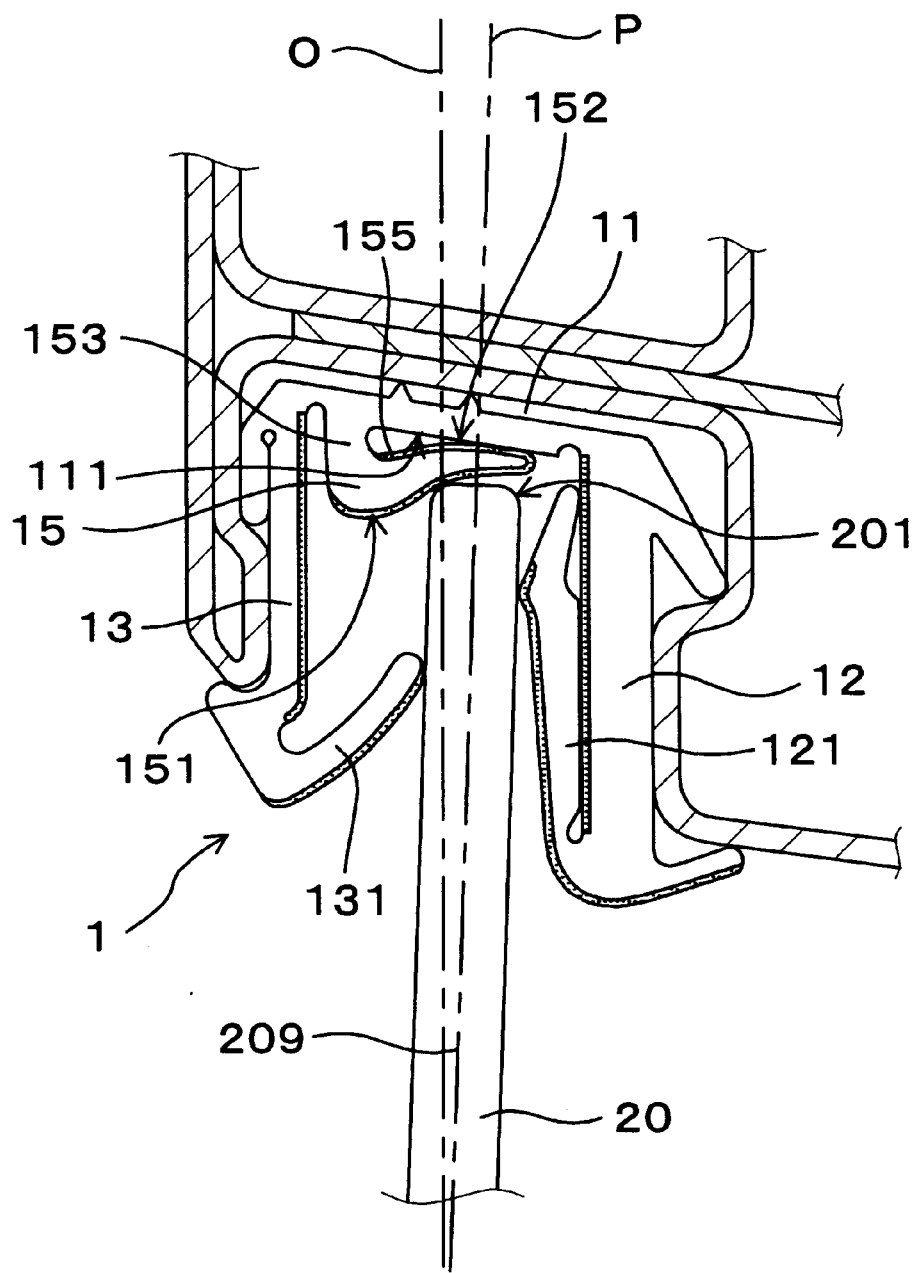
FIG. 12 is a view illustrating a state in which a closed windowpane comes into contact with a glass run channel, and is displaced inside of the vehicle in accordance with the Embodiment 2.

As shown in FIG. 12, while the windowpane 20 is closed, the windowpane 20 is displaced toward the inside of the vehicle.

Namely, after the windowpane 20 has abutted against the shock absorption member 15, the center line 209 of the windowpane 20 is displaced toward the inside of the vehicle. In FIG. 12, the dotted line marked with a sign O denotes a center line 209 before the abutment, and the dotted line marked with a sign P denotes a center line 209 after abutment.

Otherwise, in detail, the Embodiment 2 has a structure similar to the Embodiment 1.

In this way, in the case where an angle θ formed by the movement direction of the windowpane 20 and the shock absorption member 15 is not 90 degrees, when movement of the windowpane 20 stops, the windowpane 20 slides on the contact face 151 of the shock absorption member 15 coming into contact with the windowpane edge 201 in a direction in which the windowpane 20 crosses the movement direction, and can be inclined from the movement direction toward the inside of the vehicle.

Therefore, the windowpane 20 can come into strong contact with the seal lip 121 inside of the vehicle, the sealing properties at this contact portion is improved, and intrusion of water or the like into the vehicle can be reliably prevented.

Otherwise, the Embodiment 2 has an advantageous effect similar to the Embodiment 1.

Embodiment 3

The present embodiment describes a glass run channel having a shock absorption member constructed in a simple beam shape from both connecting portions.

In the glass run channel 1 shown in FIG. 13, the shock absorption member 15 has connecting portions 153 and 154 integrally connected with the base bottom portion 11, and is constructed in a simple beam shape from both connecting portions 153 and 154.

A low-friction material layer 155 is provided at a back face 152 of the shock absorption member 15 and at a contact face 151 coming into contact with the edge 201 of the windowpane 20.

The other detail is similar to that of the Embodiment 1.

The shock absorption member 15 of this glass run channel 1 has its excellent durability because the shock absorption member 15 is constructed in the simple beam shape.

Otherwise, the present embodiment has its advantageous effect similar to the Embodiment 1.

Figure 14:
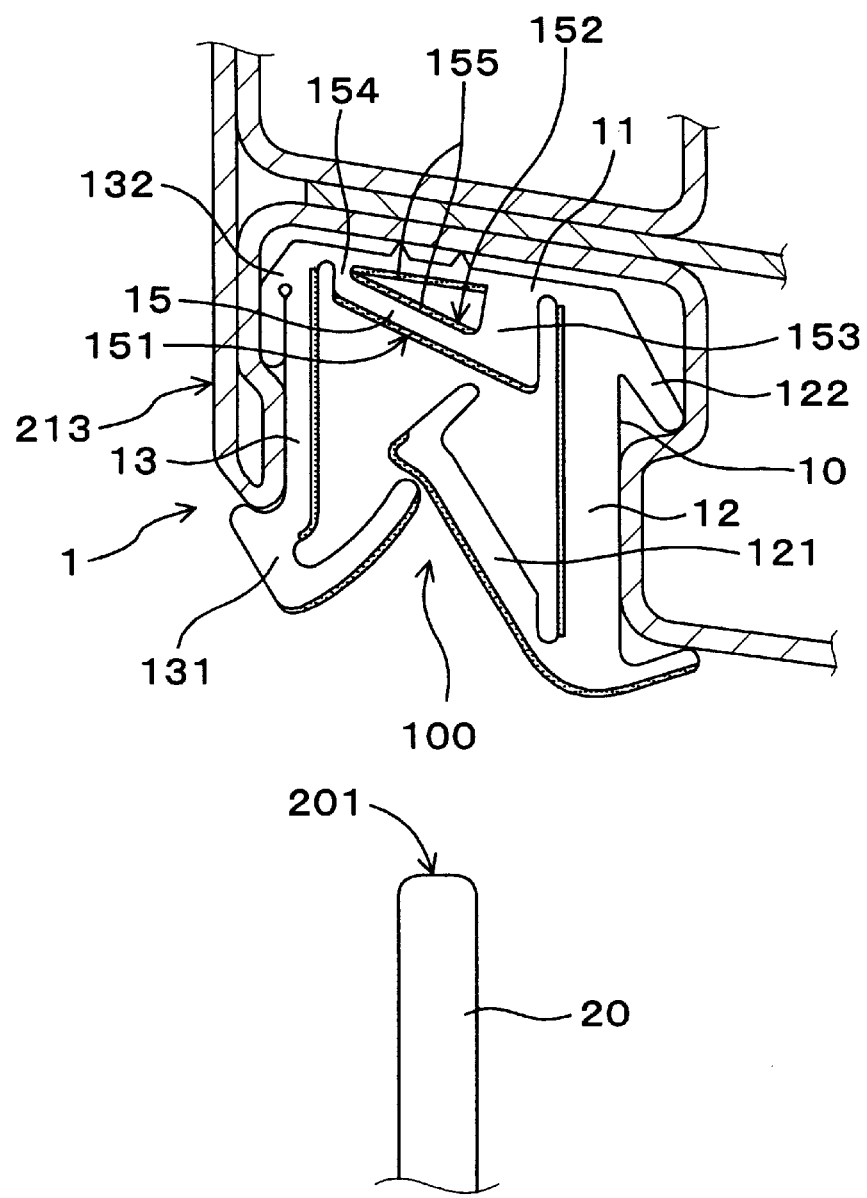
FIG. 14 is a sectional view illustrating a glass run channel in which a shock absorption member is in a simple beam shape, and low-friction material layers are provided respectively at a back face and a bottom face of a base bottom portion in accordance with the Embodiment 3.

In the glass run channel 1 shown in FIG. 14, in addition to the channel shown in FIG. 13, a low-friction material layer 155 is provided on the bottom face 111 of the base bottom portion 11 opposite to the back face 152. The other detail is similar to that of the glass run channel according to FIG. 13.

The shock absorption member 15 of this glass run channel 1 has its excellent durability because the shock absorption member 15 is constructed in the simple beam shape. In addition, a low-friction material layer 155 is provided at the bottom face 111 as well. Thus, a friction caused when the back face 152 of the shock absorption member 15 and the bottom face 111 of the base bottom portion come into contact with each other or separate from each other is further reduced, and a stick slip noise can be further reduced.

Otherwise, the present embodiment has its advantageous effect similar to the Embodiment 1.

Embodiment 4

A windowpane assembly having a horizontally (forward and rearward of a vehicle) opening and closing windowpane, a glass run channel mounted thereon, and a glass run channel assembly will be described with reference to FIG. 15 to FIG. 17.

Figure 15:
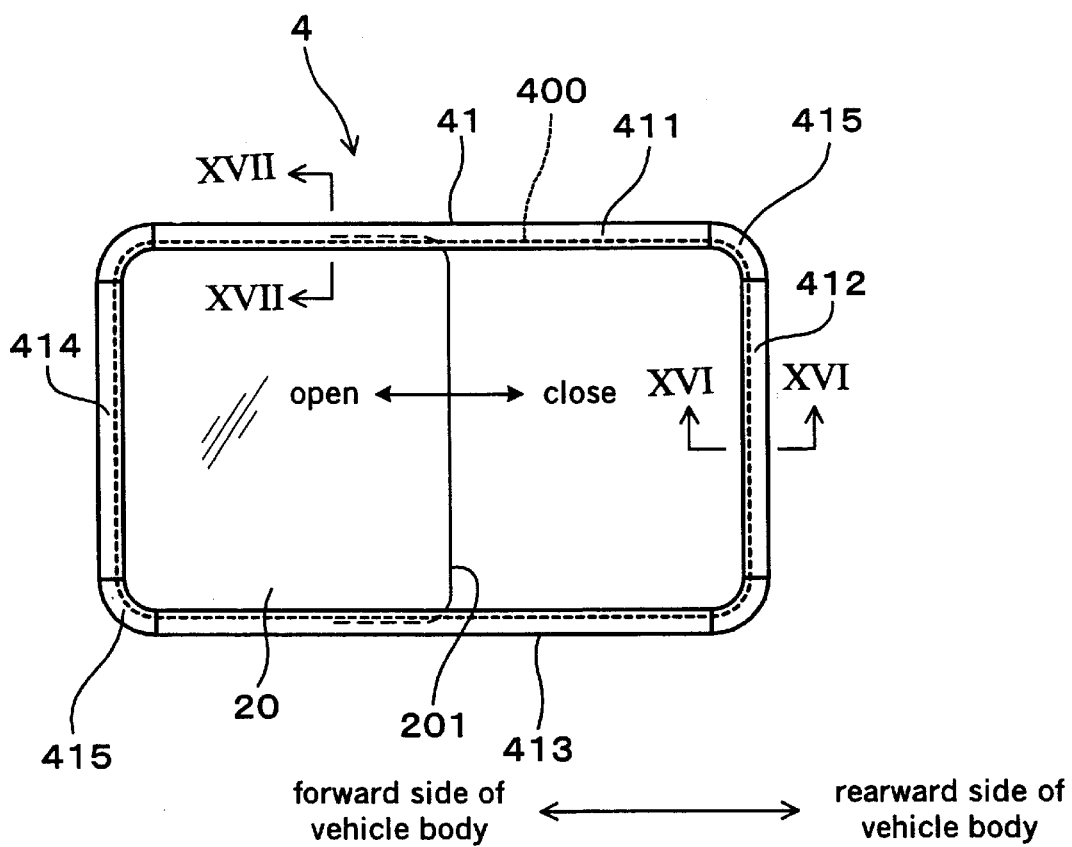
FIG. 15 is an illustrative view of a glass run channel assembly in accordance with Embodiment 4.

As shown in FIG. 15, a windowpane assembly 4 according to the present embodiment is disposed at a side of a bus, and is constructed so as to open and close a window by sliding a windowpane 20 forward and rearward of the vehicle body.

A window frame 41 is constructed so that four window frames, i.e., an upper side window frame 411, a rear side window frame 412, a lower side window frame 413, and a front side window frame 414 are connected with each other by corner frames 415. Glass run channels 45 and 495 and glass run channel assembly 400 comprising corner members are mounted relevant to the inside of this window frame 41. The glass run channel assembly 400 is shown in dotted line in the figure.

Figure 16:
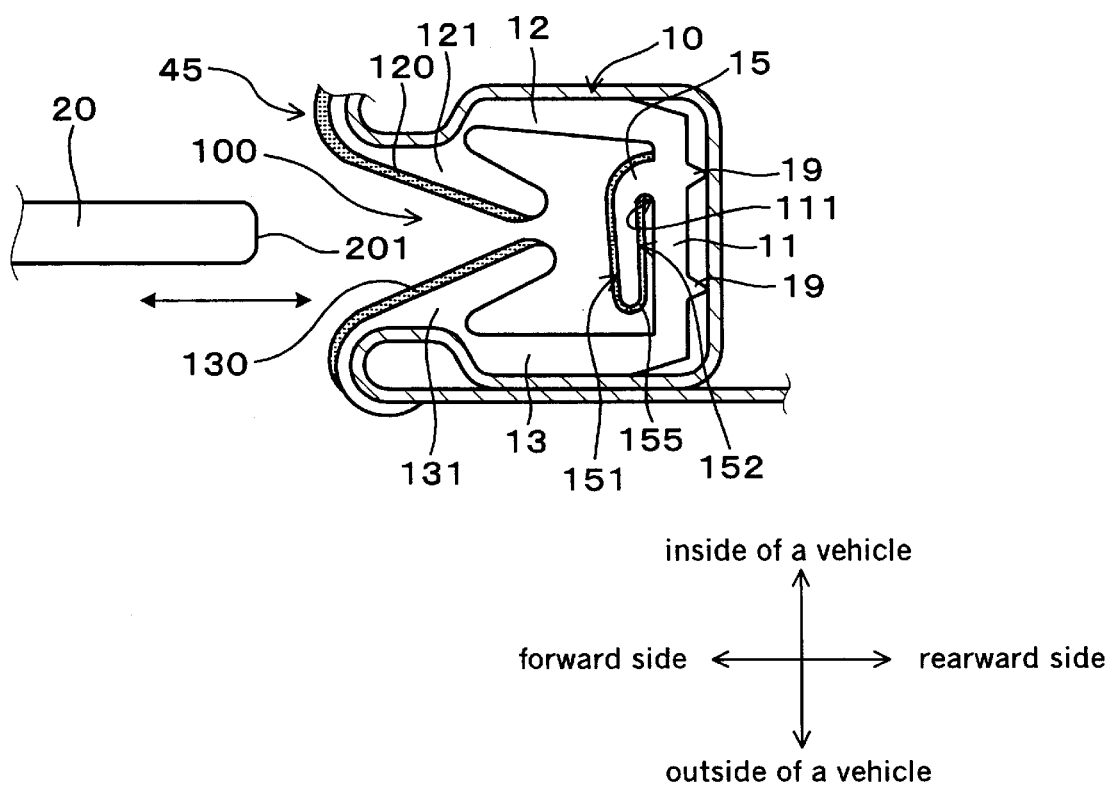
FIG. 16 is a sectional view taken along the line XVI—XVI in FIG. 15 illustrating a glass run channel having a shock absorption member in accordance with the Embodiment 4.

The glass run channel 45 according to FIG. 16 is mounted on the rear side window frame 412. The glass run channel 495 according to FIG. 17 is mounted on the other window frames 411, 413 and 414.

The windowpane 20 slides inside of the window frame 41 forward and rearward of the vehicle as indicated by the arrow shown in the figure.

A glass run channel 45 shown in FIG. 16 has a main body portion 10 that includes a pair of side wall portions 12 and 13 and a base bottom portion 11 connecting the pair of side wall portions 12 and 13, and seal lips 121 and 131 formed to be protruded from the opening edge side 100 of the pair of side wall portions 12 and 13. In addition, with respect to the seal lips 121 and 131 as well, low-friction material layers 120 and 130 are provided at sides opposite to the windowpane 20.

A shock absorption member 15 is provided at the base bottom portion 11, and a low-friction material layer 155 is integrally provided from the back face 152 to the contact face 151. In addition, the figure is a sectional view taken along line XVII—XVII in FIG. 15.

Figure 17:
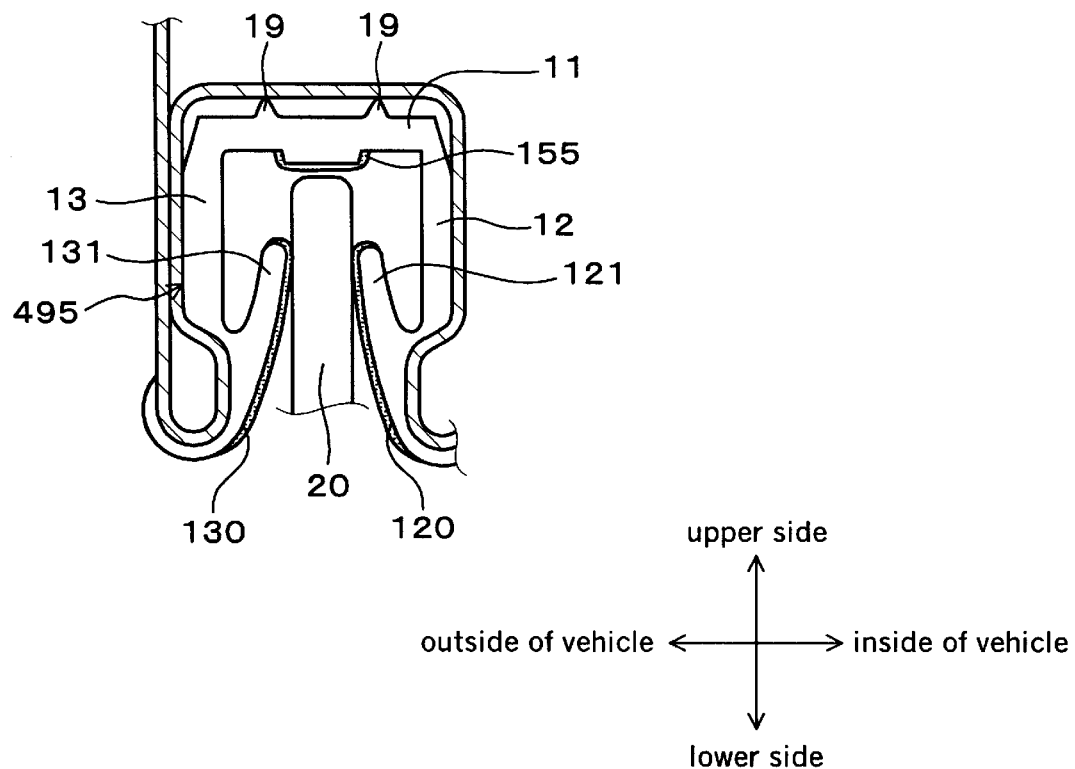
FIG. 17 is a sectional view taken along the line XVII—XVII in FIG. 15, illustrating a glass run channel that does not have a shock absorption member in accordance with the Embodiment 4.

The glass run channel 495 shown in FIG. 17 has a structure similar to that shown in FIG. 16, however no shock absorption member is provided. The figure is a sectional view taken along line G—G in FIG. 15.

Otherwise, the detail is similar to that of the Embodiment 1.

The glass run channel assembly 400 according to the present embodiment has an advantageous effect similar to that of the Embodiment 1.

Obviously, numerous modifications and variations of the present invention are possible in light of the above teachings. It is therefore to be understood that, within the scope of the appended claims, the invention may be practiced otherwise than as specifically described here.

What is claimed is:

1. A glass run channel assembly for a window frame of a vehicle and adapted to slidably receive a windowpane, the glass run channel assembly comprising:

a main body portion including a pair of side wall portions and a base bottom portion connecting the pair of side wall portions;

seal lips protruding from an opening edge side of the pair of side wall portions to the base bottom portion, a shock absorption member adapted to be provided in a direction crossing a movement direction of the windowpane with a gap provided between the base bottom portion and the shock absorption member; and low-frictional material layers provided integrally at a contact face of the shock absorption member that is adapted to come into contact with an edge of the windowpane and at least one of a back face of the contact face and a bottom face of the base bottom portion opposite the back face; wherein said low-friction material layer are composed of a thermoplastic elastomer; and wherein the window pane is displaced towards the outside of the vehicle when the windowpane contacts the shock absorption member.

2. A glass run channel according to claim 1, wherein the shock absorption member is connected integrally with at least one of the base bottom portion and side wall portion at least partly of a widthwise direction.

3. A glass run channel according to claim 1, wherein the shock absorption member has a connecting portion integrally connected with at least one of the base bottom portion and the side wall portion, and is constructed so as to be protruded from the connecting portion in a cantilever beam shape.

4. A glass run channel according to claim 1, wherein the shock absorption member has connecting portions integrally connected with at least one of the base bottom portion and the side wall portion, and is constructed so as to be protruded from the connecting portions in a simple beam shape.

5. A glass run channel according to claim 1, wherein the shock absorption member is formed so as not to be at right angles to a movement direction of the windowpane, and is adapted to incline towards an inside the vehicle.

6. A glass run channel according to claim 1, wherein the shock absorption member is formed so as not to be at right angles to a movement direction of the windowpane, and is adapted to incline towards an outside of the vehicle.

7. A glass run channel assembly for a window frame of a vehicle body, the glass run channel assembly comprising:

an abutment glass run channel adapted to be mounted to a side of the window frame against which a windowpane is adapted to abut after the windowpane has moved, and side part glass run channels adapted to be mounted substantially parallel to a movement direction of the windowpane at both sides of the abutment glass run channel;

wherein the abutment glass run channel and the side part glass run channels are assembled integrally with each other, the abutment glass run channel and side part glass run channel each having a main body portion including a pair of side wall portions and a base bottom portion connecting the pair of side wall portions and seal lips protruding from an opening edge side of the pair of side wall portions toward the base bottom portion;

wherein the abutment glass run channel has a shock absorption member adapted to be provided in a direction crossing a movement direction of the windowpane with a gap provided between the shock absorption member and the base bottom portion;

wherein low-friction material layers are provided integrally at a contact face of the shock absorption member that is adapted to come into contact with an edge of the windowpane and at least one of a back face of the contact face and a bottom face of the base bottom portion opposite the back face;

wherein the windowpane is displaced towards the outside of the vehicle when the windowpane contacts the shock absorption member;

wherein the side part glass run channel does not have a shock absorption member; and wherein the abutment glass run channel and side part glass run channel are connected to each other at respective terminals by means of an additional connection member while maintaining a predetermined angle in a nonlinear manner.

8. A glass run channel assembly according to claim 7, wherein the shock absorption member is connected integrally with at least one of the base bottom portion and the side wall portion at least partly of a widthwise direction.

9. A glass run channel assembly according to claim 7, wherein the shock absorption member has a connecting portion connected integrally with at least one of the base bottom portion and the side wall portion, and is configured to protrude from the connecting portion in a cantilever beam shape.

10. A glass run channel assembly according to claim 7, wherein the shock absorption member has connecting portions connected integrally with at least one of the base bottom portion and the side wall portion, and is constructed so as to be protruded from the connecting portions in a simple beam shape.

11. A glass run channel assembly according to claim 7, wherein the shock absorption member is adapted so as not to be at right angles to the movement direction of the windowpane, and is adapted to incline to the inside of a vehicle.

12. A glass run channel assembly according to claim 7, wherein the shock absorption member is adapted so as not to at right angles to the movement direction of the windowpane, and is adapted to incline to the outside of a vehicle.

13. The glass run channel for a window frame of a vehicle according to claim 7, wherein said low friction material layers are made of a silicone compound.

* * * * *